United States Patent [19]
Ko

[11] Patent Number: 6,097,753
[45] Date of Patent: Aug. 1, 2000

[54] SYSTEM AND METHOD FOR SIMULTANEOUS VOICE AND DATA WITH ADAPTIVE GAIN BASED ON SHORT TERM AUDIO ENERGY

[75] Inventor: Kenneth D. Ko, Clearwater, Fla.

[73] Assignee: Paradyne Corporation, Largo, Fla.

[21] Appl. No.: 08/935,782

[22] Filed: Sep. 23, 1997

[51] Int. Cl.[7] ............ H04L 25/00; H04L 27/00; H04L 5/16; H04B 1/38

[52] U.S. Cl. ............ 375/216; 375/222; 375/262; 375/264; 375/265; 375/298; 375/341; 370/206; 370/207

[58] Field of Search ............ 375/222, 260, 375/261, 262, 265, 298, 216, 295, 341, 219, 264; 370/206, 207

[56] References Cited

U.S. PATENT DOCUMENTS

| | | | |
|---|---|---|---|
| 5,440,585 | 8/1995 | Partridge, III | 375/261 |
| 5,448,555 | 9/1995 | Bremer et al. | 370/20 |
| 5,521,942 | 5/1996 | Betts et al. | 375/295 |
| 5,648,989 | 7/1997 | Ko | 375/296 |
| 5,710,754 | 1/1998 | Kaku et al. | 370/207 |
| 5,742,679 | 4/1998 | Olafsson | 380/9 |
| 5,796,716 | 8/1998 | Smith | 370/207 |

OTHER PUBLICATIONS

Bremer et al., "Simultaneous Voice and Data on the General Switched Telephone Network Using Framed QADM," IEEE Communications Magazine, Dec., 1996, pp. 58–63.

*Primary Examiner*—Stephen Chin
*Assistant Examiner*—Michael W. Maddox
*Attorney, Agent, or Firm*—Thomas, Kayden, Horstemeyer & Risley, L.L.P.

[57] ABSTRACT

An adaptive gain algorithm allows the maximization of gain of an audio signal that is transmitted with a digital data signal by allowing a trellis decoder to compensate for occasional excursions of the audio and noise signal across a signal space boundary. By measuring the short term energy present in an audio signal, the algorithm of the present invention allows the maximum power to be used to transmit an analog signal without overloading the trellis decoder.

9 Claims, 7 Drawing Sheets

Fig. 4 — 16 POINT CODED QADM CONSTELLATION

Fig. 3 — 16 POINT UNCODED QADM CONSTELLATION

SYSTEM AND METHOD FOR SIMULTANEOUS VOICE AND DATA WITH ADAPTIVE GAIN BASED ON SHORT TERM AUDIO ENERGY

CROSS REFERENCE TO RELATED APPLICATION

This document claims priority to and the benefit of the filing date of copending and commonly assigned provisional application entitled SIMULTANEOUS VOICE AND DATA WITH ADAPTIVE GAIN BASED ON SHORT TERM AUDIO ENERGY, assigned Ser. No. 60/034,100, and filed Dec. 30, 1996 and is hereby incorporated by reference.

FIELD OF THE INVENTION

The present invention relates generally to electronic data communications and, more particularly, to improving the simultaneous transmission of voice and data (SVD) by incorporating an adaptive gain based upon short term audio energy in order to maximize audio energy.

BACKGROUND OF THE INVENTION

A modem is a device for modulating and demodulating a signal for transmission over a communication path. U.S. Pat. No. 5,488,555 describes a simultaneous voice and data communication system in which an analog voice signal is added to a data signal for transmission over a communication channel and the disclosure thereof is incorporated herein as if set out in full.

In that simultaneous analog and digital communications system, the data signal to be transmitted is represented by a sequence of data symbols, where each data symbol is associated with a particular N-dimensional signal point value taken from a signal space. Similarly, the analog signal, which is represented by a voice signal, is processed so that it is mapped into the N-dimensional signal space to provide a voice signal point. This voice signal point defines the magnitude and angle of a voice signal vector about the origin of the signal space. The data symbol and the voice vector are then added together to select a resultant N-dimensional signal point, which is then transmitted to a far-end modem.

Upon reception of the transmitted N-dimensional signal point, the receiver of the far-end modem detects the embedded data symbol and subtracts the data symbol from the received N-dimensional signal point to yield the voice signal vector. This voice signal vector is then used to recreate the voice signal.

In an uncoded modulation scheme, the selected signal point is taken from a constellation signal space that is divided into a number of non-overlapping regions, each region being associated with a data symbol. In a coded modulation scheme, some overlap is allowed due to the ability of the decoder to distinguish and compensate for the excursions of the analog component of the signal into adjoining signal space regions. Consequently, any signal point value within a region may be validly selected for transmission to a receiving modem. Since each signal point region is either nonoverlapping, or allowed some overlap to be corrected by coding, the voice signal vector is constrained to be of a certain maximum size, so that the selected signal point for transmission always lies within the selected region, or within an adjoining region which will not overload the coding scheme.

While various modulation schemes can be used to generate the modulated signal used in a modem, typically the modulated signal is the result of quadrature amplitude modulation (QAM). This modulation signal represents a sequence of data symbols, where each data symbol is a selected signal point from a multi-dimensional signal space constellation.

An advancement of QAM modulation is known as framed quadrature audio/data modulation (QADM). Framed QADM supplements the data-only signal space with continuous-level, N-dimensional sampled waveforms and communicates digital side information derived in the processing of the audio signal for accurate reconstruction at the receiver. All of the communications advances applied to QAM, such as adaptive equalization and echo-cancellation, also apply to framed QADM. For a complete analysis on framed QADM see Gordon Bremer and Kenneth D. Ko, "Simultaneous Voice and Data on the General Switched Telephone Network Using Framed QADM", IEEE Communications Magazine, pp.58–63, Dec. 1996.

QADM symbols are constrained to one of a set of discrete two-dimensional points. The processed audio component, however, is a continuous amplitude signal. As a result, the QADM symbols may occur at any point within the N-dimensional regions defined within the constellation. Since the regions do not overlap, or overlap only to a degree which can be compensated for by the coding scheme, both the audio and data components are defined uniquely by the QADM constellation.

Typically, a convolutional error correction technique may be used with QADM modulation in order to allow and compensate for the overlap of signal space regions. One such convolutional error correction technique is a channel encoding scheme known as trellis coding. With trellis coding, the transmitting modem selects data symbols not only as a function of the current value of the data signal in any time interval, but also as a function of antecedent values of the data signal. The trellis coding system is optimized to remove channel errors which appear as additive white gaussian noise (AWGN) introduced by the communication channel. This AWGN can be visualized as very occasional excursions across the signal space boundary of a particular data symbol.

In order to maximize the dynamic range available to an audio signal, thus improving the quality of the voice signal that has been added to a digital data symbol, it is desirable to achieve a uniform distribution, within a signal space boundary, of the voice component. Unfortunately, this uniform distribution easily overloads the trellis coding system because it is not gaussian in nature. Thus, it would be desirable to allow the correction of voice signals that occasionally exceed the associated signal space boundary, while not overloading and causing excessive errors in the trellis decoder.

SUMMARY OF THE INVENTION

In accordance with the invention, in a communications system that includes error correcting techniques, such as trellis encoding, an adaptive gain algorithm allows the gain of an audio signal to be set in a transmitter such that the received signal can be accurately reconstructed in a receiver without overloading the trellis decoder. The adaptive gain of the analog signal is set in a transmitter by estimating a maximum value of the short term energy level present in the audio signal and then normalizing that energy level in order to maximize the gain of the analog signal such that the characteristics of the analog signal are matched to a decoder in a receiver. The relatively high power voice energy is distributed evenly throughout a signal space region and combines with channel noise. This appears to the trellis coder as an error signal having occasional excursions across the signal space boundaries. Without accurately setting the gain of the audio signal in the transmitter based upon measured analog signal energy, this effect causes the trellis code to quickly break down and consequently causes the trellis decoder to fail to decode the voice signal.

The algorithm of the present invention captures a maximum short term energy level in the audio signal using an adjustable sliding window of length N in order to estimate the maximum power in the audio frame. This sliding window enables the present invention to estimate the maximum power in the audio signal and uses this information to determine the maximum gain to apply to the analog signal in the transmitter. This maximum power is calculated so as to prevent the trellis decoder at the receiver from being overloaded.

This technique enables the maximum amount of power to be transmitted in an analog signal while ensuring that the trellis decoder at the receiving modem will be able to reliably decode the transmitted information.

The invention also provides for a method of data communication comprising the steps of providing a digital data signal to a first encoder and an analog signal to a second encoder. Once these signals are encoded, the present invention sets the gain of the transmitter for the analog signal based upon an estimate of the maximum short term energy present in the analog signal. The gain is set in order to normalize the short term energy parameter, thus allowing the maximum amount of power to be transmitted so as to prevent the decoder in the receiver from becoming overloaded.

The adaptive gain algorithm captures the maximum short term energy level in the audio signal by using an adjustable sliding window of length N in order to estimate the maximum energy level present in each analog frame. By setting the adaptive gain based on the maximum energy present in an adjustable short term window, the maximum gain can be achieved for the audio signal while ensuring that it will not be too large for the trellis decoder to reliably decode. In the preferred embodiment, a short sliding window, on the order of N≈16 is used, although the invention is not limited to that value of N.

The invention has numerous advantages, a few of which are delineated hereafter.

An advantage of the present invention is that it allows the maximum amount of analog energy to be transmitted in a frame without overloading the decoder.

Another advantage of the present invention is that it uses an energy measure, rather than one based on peaks, thus signals with low peak-to-average ratios (such as tones) are limited properly.

Another advantage of the present invention is that it is simple in design, reliable in operation, and easily implemented in mass for commercial production of modems.

Other objects, features, and advantages of the present invention will become apparent to one with skill in the art upon examination of the following drawings and detailed description. It is intended that all such additional objects, features, and advantages be included herein within the scope of the present invention, as set forth hereinafter.

BRIEF DESCRIPTION OF THE DRAWINGS

The present invention, as defined in the claims, can be better understood with reference to the following drawings.

The drawings are not necessarily to scale, emphasis instead being placed on clearly illustrating the principles of the present invention.

DETAILED DESCRIPTION OF THE PREFERRED EMBODIMENT

Figure 1:
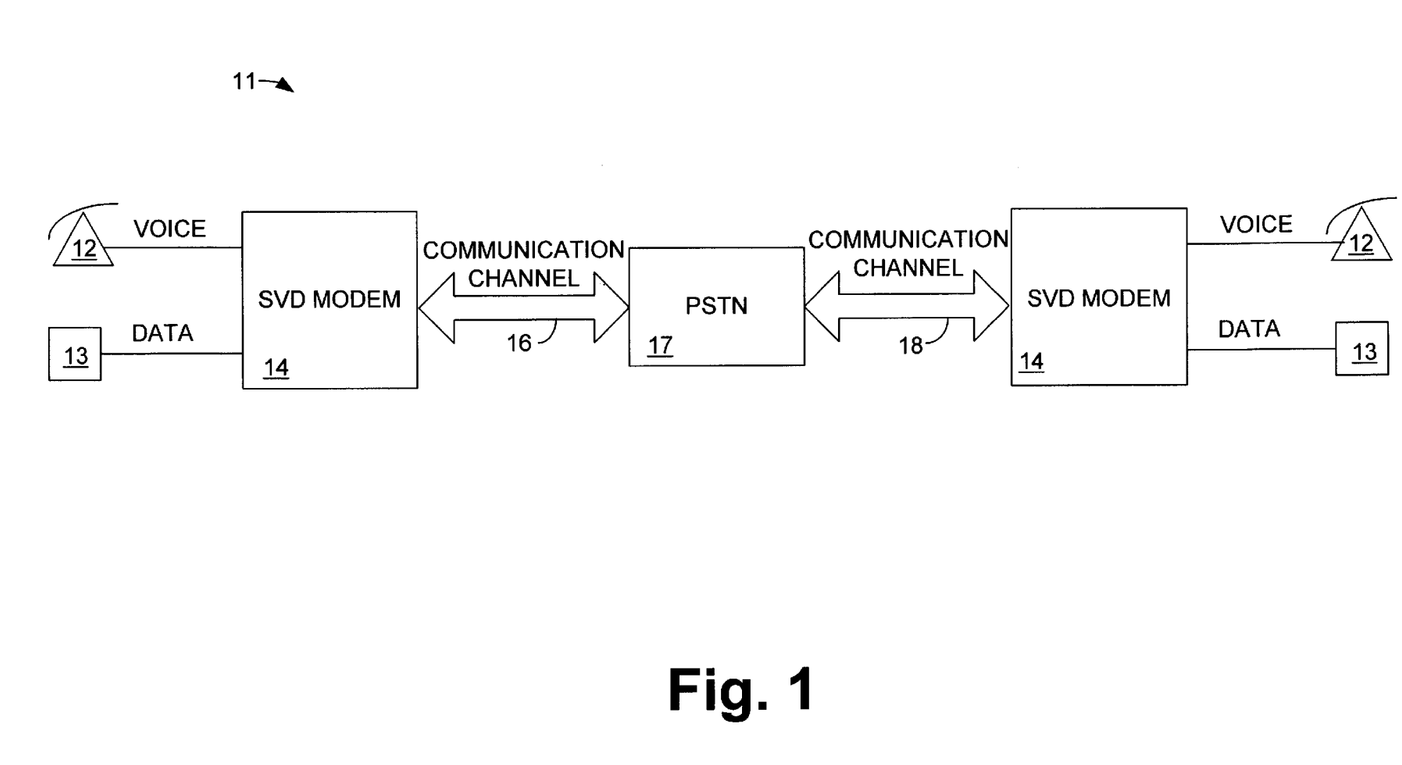
FIG. 1 is an overall system block diagram of an SVD communications channel.

FIG. 1 is a schematic view illustrating a basic SVD modem. In general, an SVD modem operates as follows. The digital data stream entering the transmitter section is divided into bit groups, and each bit group is mapped to a pair of symbol components. The analog signal entering the transmitter section is sampled and each pair of successive samples forms a set of analog vector components. The analog vector components are added, respectively, to the symbol components and the component sums are quadrature amplitude modulated (QAM) to form the output signal. The pairs of analog samples are derived by simply delaying the analog signal and sampling both the delayed and the undelayed versions.

At the receiver, the signal is first demodulated and the digital signal is detected in accordance with standard modulation/demodulation technology. The detected digital signal is then subtracted from the received signal to form analog sample pairs that are combined to reconstitute the analog signal.

In general operation, SVD modem 14 receives as input a digital signal from device 13, which can be for example, a computer, and receives as input an analog signal from device 12, which can be for example, a conventional telephone. It is understood that the inputs to SVD modem 14 can also be two digital signals, however, an analog and a digital input signal are illustrated here. SVD modem 14 combines the analog and digital data as is known in the art of simultaneous analog and digital communications and transmits a combined QAM signal containing both the analog and digital information onto communication channel 16. Public switched telephone network (PSTN) 17 provides a switching function and routes the signal to far end communications channel 18 for connection to far end SVD modem 14. As is known in the art of simultaneous analog and digital communications, far end SVD modem 14 demodulates and separates the analog and digital signals for routing to analog device 12, which can be a conventional telephone, and digital information to digital device 13, which can be for example, a computer.

Figure 2:
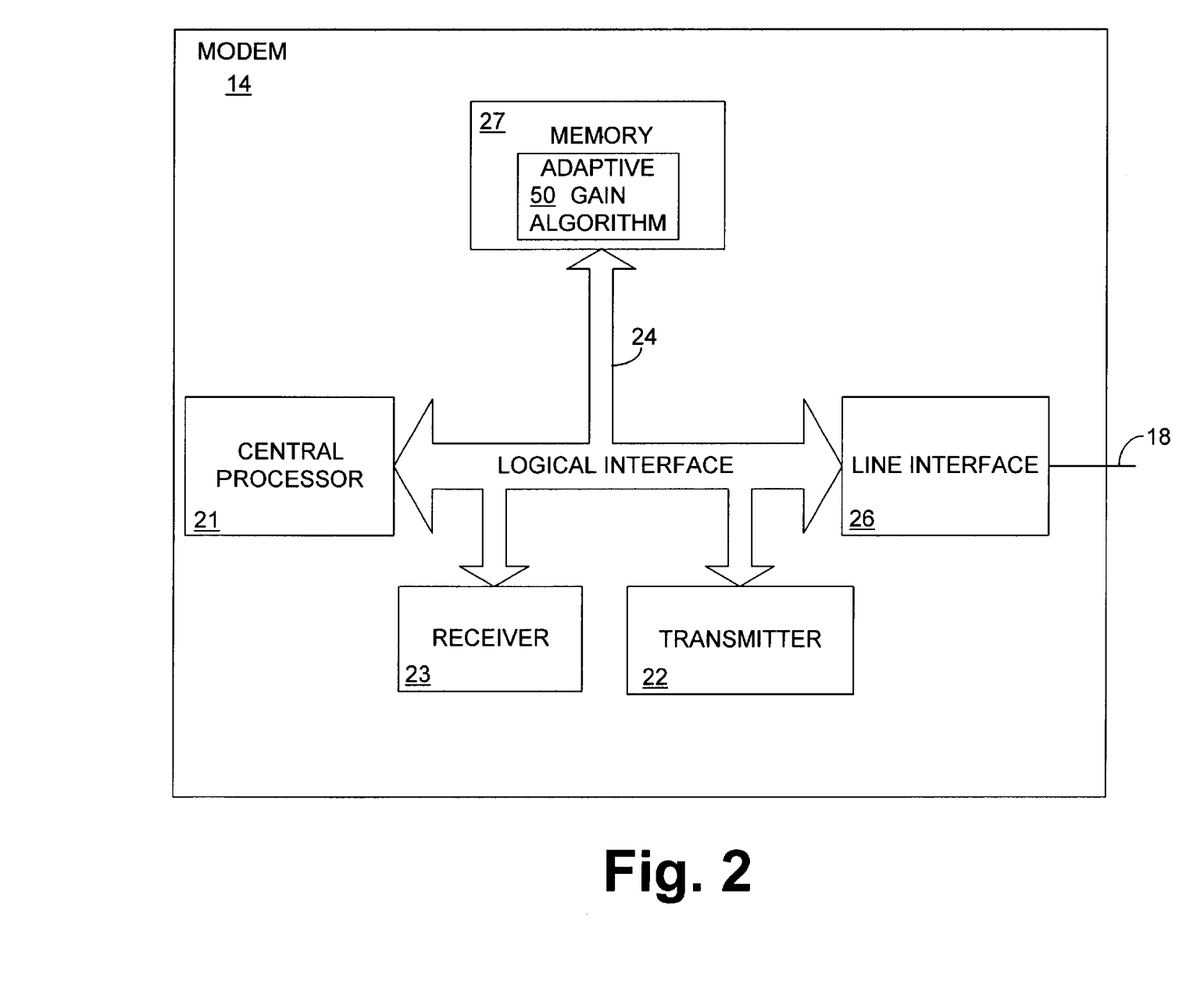
FIG. 2 is a block diagram of an SVD modem of FIG. 1 embodying the concepts and features of the present invention.

Referring now to FIG. 2, shown is a block diagram of an SVD modem 14 of FIG. 1 embodying the concepts and features of the present invention. Modem 14 includes elements as is known in the field of communications including central processor 21, memory 27, transmitter 22 and receiver 23. The elements of modem 14 communicate over logical interface 24, with line interface 26 providing access to communications channel 18. Also included in memory 27 is the adaptive gain algorithm 50 which provides the logical operating procedures employed by the present invention.

Figure 3:
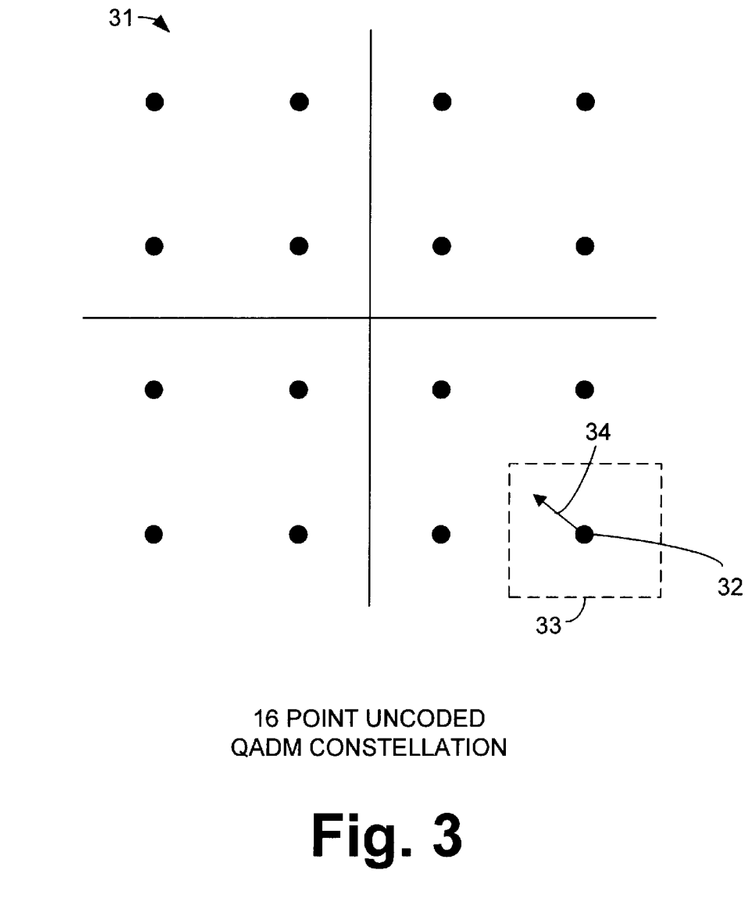
FIG. 3 is a graphical representation of an uncoded 16 point QADM constellation.

FIG. 3 shows a graphical representation of an uncoded 16 point QADM constellation as is known in the modem art. The in-phase and quadrature samples developed by a QADM modulation scheme, as is known in the art, specify a location 32 in the signal space of FIG. 3. The set of possible samples that a QADM modulator can produce corresponds to a set of sample points, or a constellation of points. For simplicity, a constellation of 16 points is illustrated, however, as is known in the art, constellations with a larger number of signal points are possible. In addition to the data only signal points as shown in FIG. 3, each data point is surrounded by a region 33 in which an analog, or in the case of the present invention, a voice signal illustrated by vector 34, can be added. This region is illustrated by the dashed line surrounding point 32. These analog signals form "signal clouds" around each digital constellation point (i.e. point 32) and are restricted in their dynamic range to be totally contained within the region 33. Vector 34 can represent an audio component added to digital signal point 32 in signal space 33. As can be seen, vector 34 is contained within space 33, which effectively limits its dynamic range to a level that can be decoded and interpreted by a receiver.

Figure 4:
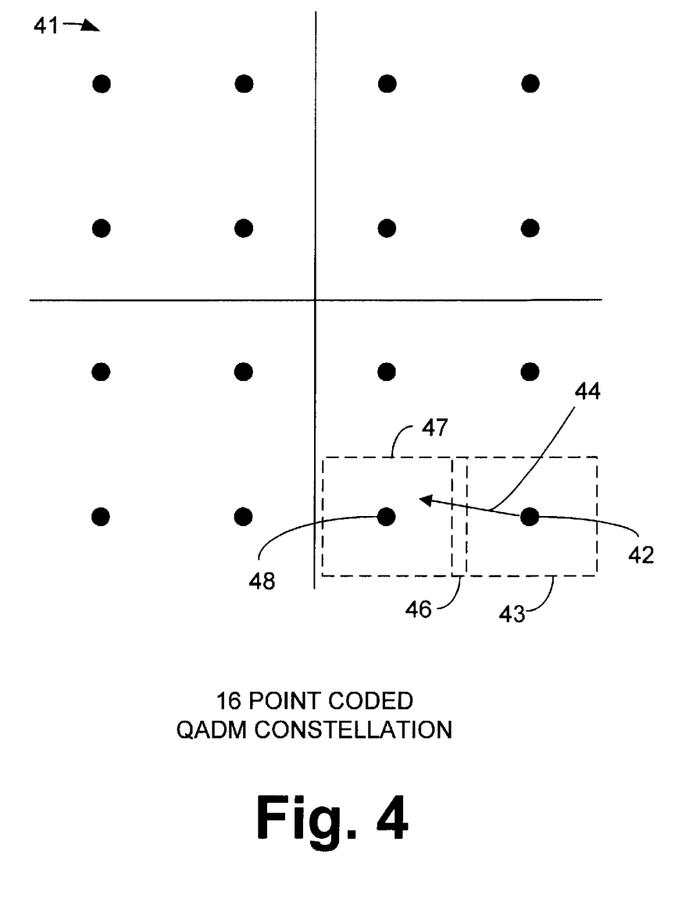
FIG. 4 is a graphical representation of a coded 16 point QADM constellation.

FIG. 4 shows a graphical representation of a coded 16 point QADM constellation. Similar to the constellation shown in FIG. 3, the in-phase and quadrature samples developed by a QADM modulation scheme specify points in the signal space. Point 42 is surrounded by region 43 and point 48 is surrounded by region 47. Unlike an uncoded constellation, however, the coded constellation of FIG. 4 allows regions 43 and 47 to overlap. This overlap region is depicted as region 46. By employing a coding scheme, such as trellis coding, analog vector 44 is permitted to occasionally exceed the boundary of region 43 while still allowing the decoder to decode the information contained within transmitted symbol 42 and vector 44. Because these excursions occur infrequently, and primarily contain channel noise having gaussian characteristics, the infrequent excursions do not overload the decoder.

Figure 5:
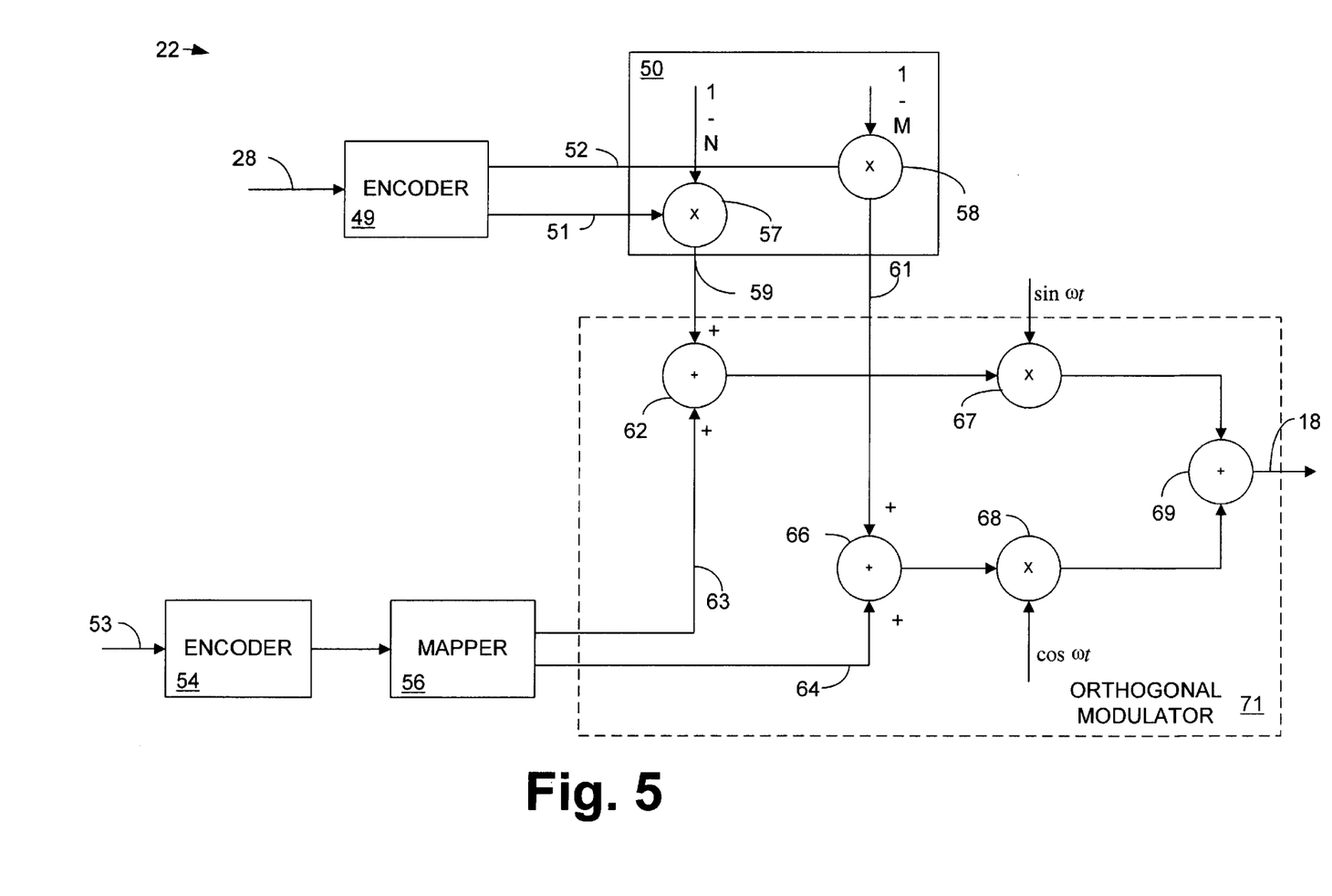
FIG. 5 is a block diagram of a transmitter of the modem of FIG. 2 including the concepts and features of the present invention.

With reference now to FIG. 5, shown is a block diagram of transmitter 22 of the modem of FIG. 2 employing the concepts and features of the present. Transmitter 22 includes channel encoder 54 responsive to digital signals applied on line 53. Channel encoder 54 operates in accordance with known encoding techniques and is illustratively a trellis encoder as is known in the art. In each signaling interval, channel encoder 54 provides a data encoded digital signal to mapper 56, which develops two output pulses on lines 63 and 64 respectively, each of which possess an amplitude that relates to the encoded digital signals arriving on line 53. Also included is encoder 49 that responds to an applied analog signal, or a voice signal in the preferred embodiment, applied on line 28. Encoder 49 develops two analog signals on lines 51 and 52, which represent samples of the voice signal and also provide the signal point coordinates for the voice signal vector in every signaling interval. Outputs 51 and 52 are applied to adaptive gain device 50 which includes gain elements 57 and 58 respectively. Elements 57 and 58 apply gain to the analog signal in such a way that the magnitude in each dimension will be no greater than a value corresponding to the maximum short term energy present in the analog signal. The determination of the maximum energy present in the analog signal will be discussed in detail hereafter. For the purposes of this preferred embodiment, because each region is square, the scalar values of both elements 57 and 58 are equal, i.e., N=M. However, by allowing N and M to vary independently, it is possible to achieve higher performance. Outputs 59 and 63 are combined in adder 62 and outputs 61 and 64 are combined in adder 66. The outputs of adders 62 and 66 form the components of the signals that are represented by the signal space of FIG. 3. The outputs of adders 62 and 66 are applied to modulators 67 and 68 and summed in adder 69 to form a modulated signal as is known in the art for transmission over communications channel 18. In FIG. 5, element 56 can be an M-to-N mapper. That is, element 56 can be responsive to a plurality (M) of encoded digital signals and it can develop a different plurality (N) of output signals. Similarly, element 49 can be an M-to-K encoder that is responsive to a plurality of analog signals.

In the context of signal space, the N pluralities of output signals of elements 49 and 56 (assuming N is larger than K) correspond to a collection of components of vectors in multi-dimensional space, i.e., N-dimensional space. The coordinates of this N-dimensional space correspond to the orthogonal modulation signals within orthogonal modulator 71. In FIG. 5, the two orthogonal modulation signals are cos $\omega t$ and sin $\omega t$, however other modulation signals are possible. For example, but not limited to, code division multiplexing (CDMA). For the purposes of this preferred embodiment, orthogonal modulation signals are modulation signals that allow the receiver to separate the received signal into its element signals, those being the signals developed in response to each of the modulation signals. Although the arrangement of transmitter 22 allows errors to be introduced into the transmitted data signal in such a way that the receiver will likely make errors, the underlying error correction technique, in this example, trellis encoding, together with the adaptive gain algorithm to be disclosed hence, allows a receiver to recover the original sequence of data and voice symbols selected for transmission by performing the channel decoding process in accordance with the principles of the present invention.

Figure 6:
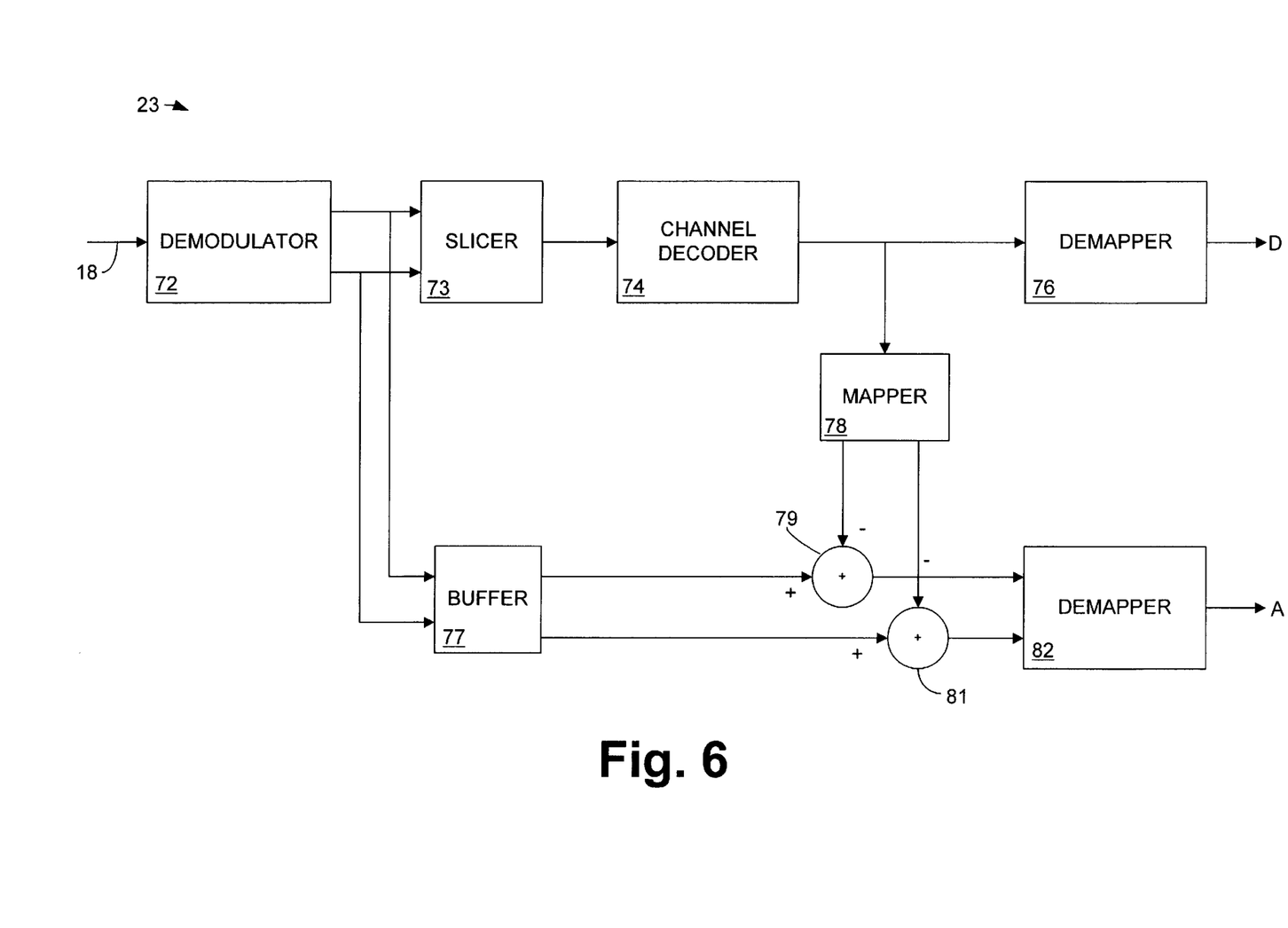
FIG. 6 is a block diagram of a receiver of the modem of FIG. 2 including the concepts and features of the present invention.

Referring now to FIG. 6, shown is a block diagram of receiver 23 of the modem of FIG. 2 employing the concepts and features of the present invention. The modulated input signal received from communications channel 18 is applied to demodulator 72 which develops the in-phase and quadrature components. Those components are applied to slicer 73 which calculates an "error metric", or "transition metric" for each of the data symbols from the constellation of FIG. 3. This error metric is the distance the received signal point is from each data symbol. Slicer 73 provides the error metric for each of the data symbols to channel decoder 74, which is illustratively a Viterbi decoder as is known in the art. Channel decoder 74 adds each error metric to a stored "path metric" for each state of the trellis code and then selects a new path metric for each trellis code state. Each new path metric has the smallest sum of error metrics. Channel decoder 74 estimates a received data symbol sequence before deciding on a particular data symbol in order to minimize the overall errors in the entire received symbol sequence.

In order to recover the voice signal, buffer 77, receives the outputs from demodulator 72 and provides a time delay that allows for the trellis decoding to be completed first in channel decoder 74. Also included is mapper 78 that is responsive to the symbols developed by channel decoder 74. The output of mapper 78 is the set of in-phase and quadrature components that are applied in the FIG. 5 arrangement to elements 62 and 66. The outputs of mapper 78 are subtracted from the outputs of buffer 77 in subtractors 79 and 81. The outputs of subtractors 79 and 81 are applied to demapper 82 which recombines the voice samples to form the original analog, or in this preferred embodiment, the voice signal.

Figure 7:
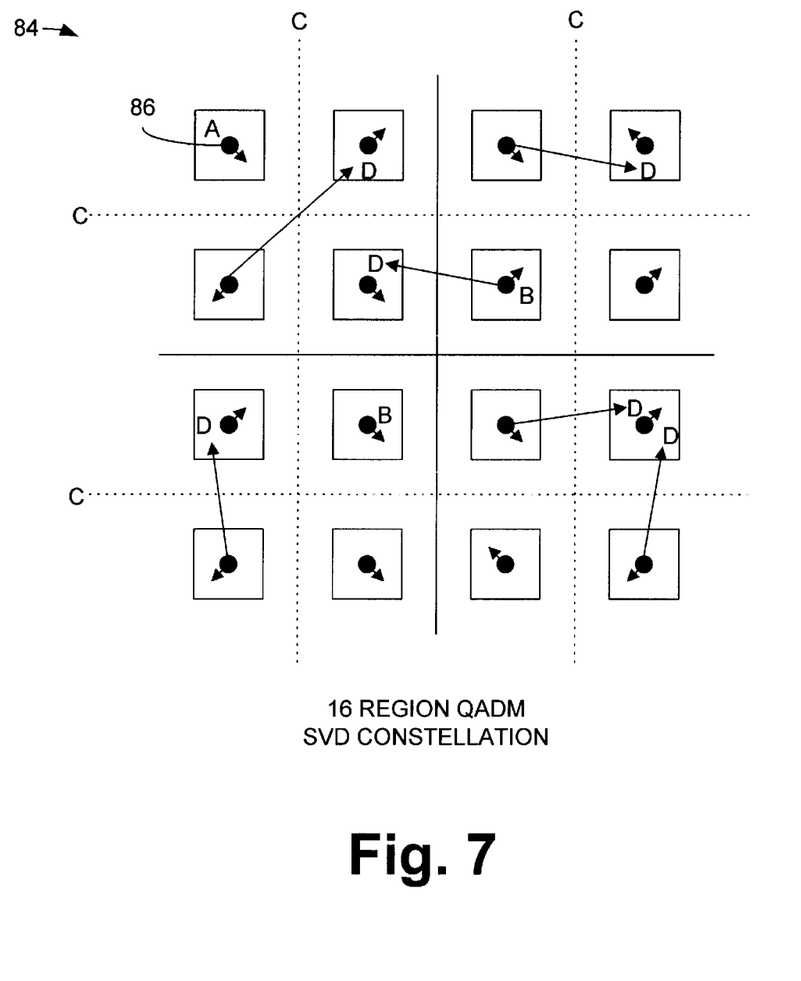
FIG. 7 is a graphical representation of a 16 region QADM signal constellation as employed in the present invention.

The operation of the present invention will now be discussed in detail. With reference now to FIG. 7, shown is a graphical representation of a 16 region QADM signal constellation as employed in the present invention. In accordance with the present invention, one of 16 regions surrounding a data symbol 86 is denoted by "A". Vectors denoted by "B" illustrate the displacement from the center of the region (or the data signal point) due to the presence of an audio symbol. For this preferred embodiment, an audio signal is illustrated, however, the concepts of the present invention apply to any analog signal. Because of the nature of audio energy, it is desirable to have the audio energy of a signal point, B, evenly distributed within each signal space region. The audio energy is of much higher power than the added channel noise. Because the audio energy is viewed as an error signal by the trellis decoder, all the trellis decoder sees in the signal space region is noise. However, because the audio energy, which is at a much higher power level than the channel noise, is not gaussian in nature, the trellis decoder is easily overwhelmed when attempting to decode the signal if the audio signal is too high. Vectors denoted by "D" represent the frequent excursions across the signal space boundaries of the voice energy and the channel noise.

It is desirable to allow the largest dynamic range for each audio signal. This translates into allowing the audio signal, represented by vector B, to encompass the largest possible area within a signal space region defined about a data signal point, such as region A. Vector D illustrates the case where the analog, or voice, signal combined with the channel noise energy has exceeded the boundary of the signal space region. When this occurs frequently, as in the present case of nongaussian analog energy combined with channel noise, the trellis decoder breaks down and cannot decode the embedded information. In order to prevent the trellis decoder from breaking down, the algorithm of the present invention estimates the maximum amount of analog, or audio, energy present in each audio frame, and uses the estimate to set the analog gain in the transmitter so as to prevent a voice vector from frequently exceeding its signal space boundary, the therefore, prevent the trellis decoder from overloading.

Figure 8A:
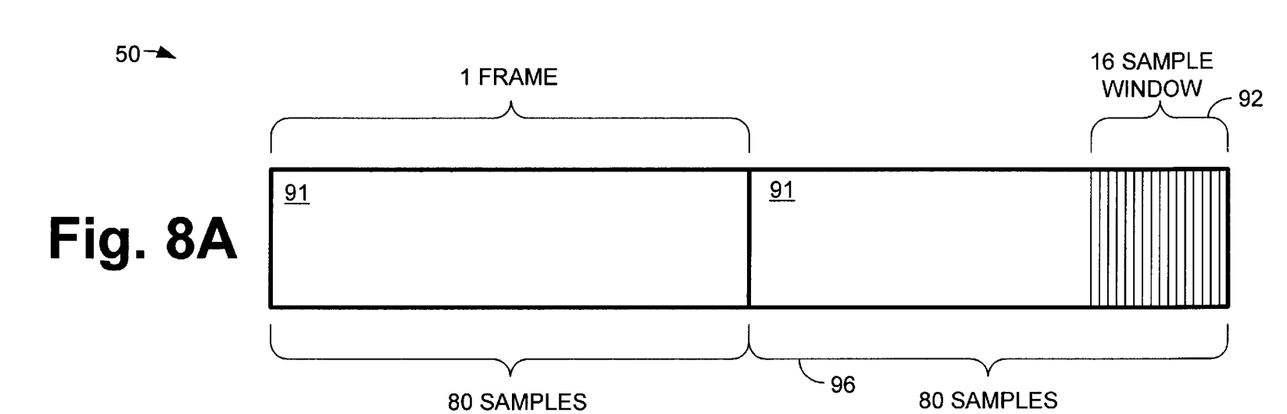
FIGS. 8A–8C is a graphical representation of the frame sampling employed in the modem of FIG. 2.
Figures 8B, 8C:
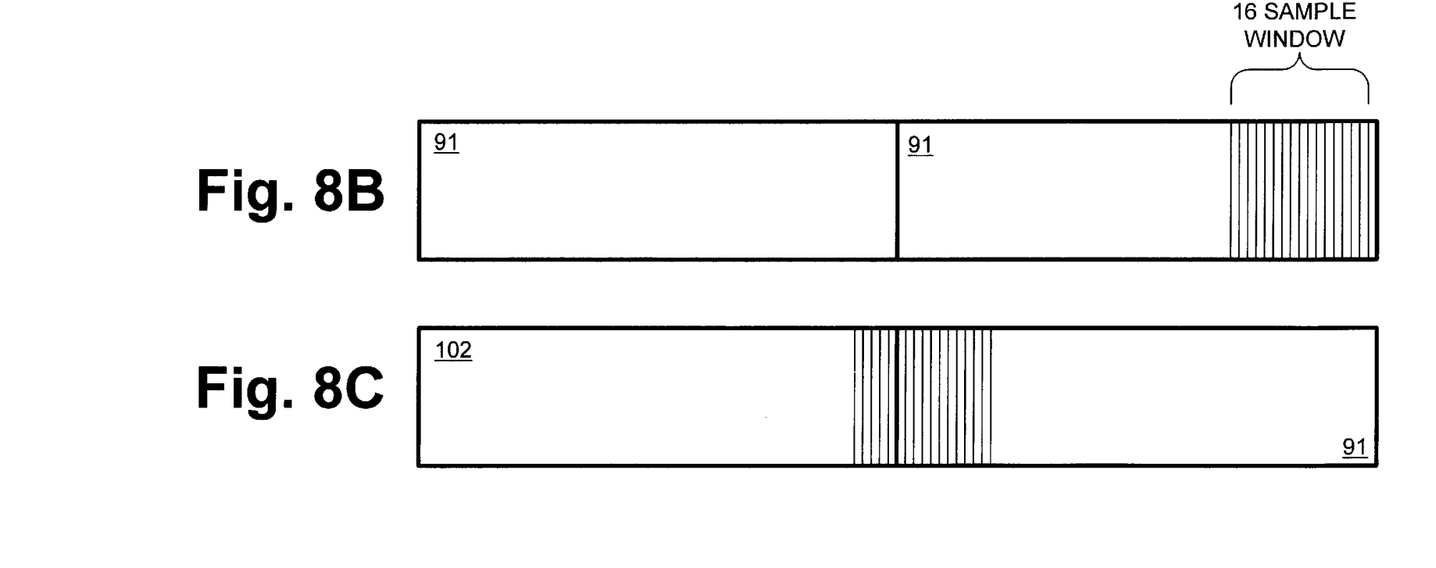

FIGS. 8A, 8B and 8C collectively show a graphical representation of the frame sampling employed by the present invention. Ideally, for the preferred embodiment, the length of the sliding window is approximately N≈16, however, in practice it should be optimized for the particular coder in use. The excursions across region boundaries can be corrected by the trellis decoder by employing the algorithm of the present invention to limit the gain applied to the analog signal in the transmitter.

In the preferred embodiment, one audio frame 91 contains 80 samples 96. Sliding sample window 92 contains 16 samples. In FIG. 8A, sliding window 92 is measuring samples 1 through 16 of frame 91. Window 92 sequentially progresses through frame 91 and is said to be sliding because, as shown in FIG. 8B, window 92 is now measuring samples 2 through 17 of frame 91. Window 92 continuously progresses through each frame taking continuous power measurements of the energy present in the 16 samples being measured at any time. The maximum power measured for each 16 samples is correlated to a power level by the algorithm of the present invention and sent to the transmitter. The transmitter adjusts the gain of the audio energy based upon the measured maximum energy of each frame 91, thereby ensuring that the trellis decoder in receiver 23 is able to decode the transmitted information. FIG. 8C illustrates sliding window 92 as it encompasses audio frames 91 and 102. As can be seen, window 92 sequentially passes from frame 91 to frame 102 measuring sample 70 of frame 91 through sample 5 of frame 102. This ensures the continuous measurement of audio energy.

Specifically, the pseudocode for capturing the maximum energy is based on a frame of length F, where the F samples in the frame are buffered as $x(0)$ to $x(F-1)$ and the last N samples in the previous frame are buffered as $x(-N)$ to $x(-1)$, and is illustrated as follows:

maxEnergy=0
for i=0 to F-1
   stEnergy=stEnergy+$x(i)^2$-$x(i-N)^2$ (assumes last stEnergy value from last frame is still valid)
   if stEnergy>maxEnergy then maxEnergy=stEnergy
next The application of this adaptive gain algorithm allows the audio energy to be maximized, thus allowing greater dynamic range for the audio component of the signal, without overloading the trellis decoder.

It will be obvious to those skilled in the art that many modifications and variations may be made to the preferred embodiments of the present invention, as set forth above, without departing substantially from the principles of the present invention. For example, but not limited to the following, it is possible to implement the present invention in a coded or an uncoded environment, while still practicing the concepts of the invention, as set forth previously. All such modifications and variations are intended to be included herein within the scope of the present invention, as defined in the claims that follow.

Further note that the elements of present invention, as described above, can be implemented with respective software, firmware, hardware, or a combination thereof. In the preferred embodiment, the elements of adaptive gain algorithm are implemented in software that is stored in a memory and that configures and drives a suitable digital signal processor (DSP) situated in the respective modem. Furthermore, the foregoing software can be stored on any computer-readable medium for use by or in connection with a computer-related system or method. In the context of this document, a computer-readable medium is an electronic, magnetic, optical, or other physical device or means that can contain or store a computer program for use by or in connection with a computer-related system or method In the claims set forth hereinafter, the structures, materials, acts, and equivalents of all "means" elements and "logic" elements are intended to include any structures, materials, or acts for performing the functions specified in connection with said elements.

The following is claimed:

1. A modem, comprising:
   a transmitter;
   a first encoder for encoding a digital data signal a second encoder for encoding an analog signal; and
   an adaptive gain algorithm for setting in said transmitter the adaptive gain of an analog signal, by estimating the maximum value of a short term energy parameter of said analog signal, said adaptive gain being set to normalize said short term energy parameter.

2. The modem of claim 1, wherein said algorithm captures said maximum short term energy level in said audio signal using an adjustable window of length N.

3. The modem of claim 2, wherein said adjustable window of length N is optimized for a trellis decoder.

4. A method for data communication, comprising the steps of:

providing a digital data signal to a first encoder, said first encoder designed to encode said digital data signal;

providing an analog signal to a second encoder, said second encoder designed to encode said analog signal; and setting in a transmitter associated with said first encoder and said second encoder the adaptive gain of an analog signal, by estimating the maximum value of a short term energy parameter of said analog signal, said adaptive gain being set to normalize said short term energy parameter.

5. The method of claim 4, further comprising an adaptive gain algorithm, said algorithm designed to capture said maximum short term energy level in said audio signal using an adjustable window of length N.

6. The method of claim 5, wherein said adjustable window of length N is optimized for a trellis decoder.

7. A computer readable medium having a program for data communication, the program comprising:

means for providing a digital data signal to a first encoder, said first encoder designed to encode said digital data signal;

means for providing an analog signal to a second encoder, said second encoder designed to encode said analog signal; and means for setting in a transmitter associated with said first encoder and said second encoder the adaptive gain of an analog signal, by estimating the maximum value of a short term energy parameter of said analog signal, said adaptive gain being set to normalize said short term energy parameter.

8. The program of claim 7, further comprising an adaptive gain algorithm, said algorithm designed to capture said maximum short term energy level in said audio signal using an adjustable window of length N.

9. The program of claim 8, wherein said adjustable window of length N is optimized for a trellis decoder.

* * * * *